Figure 1:
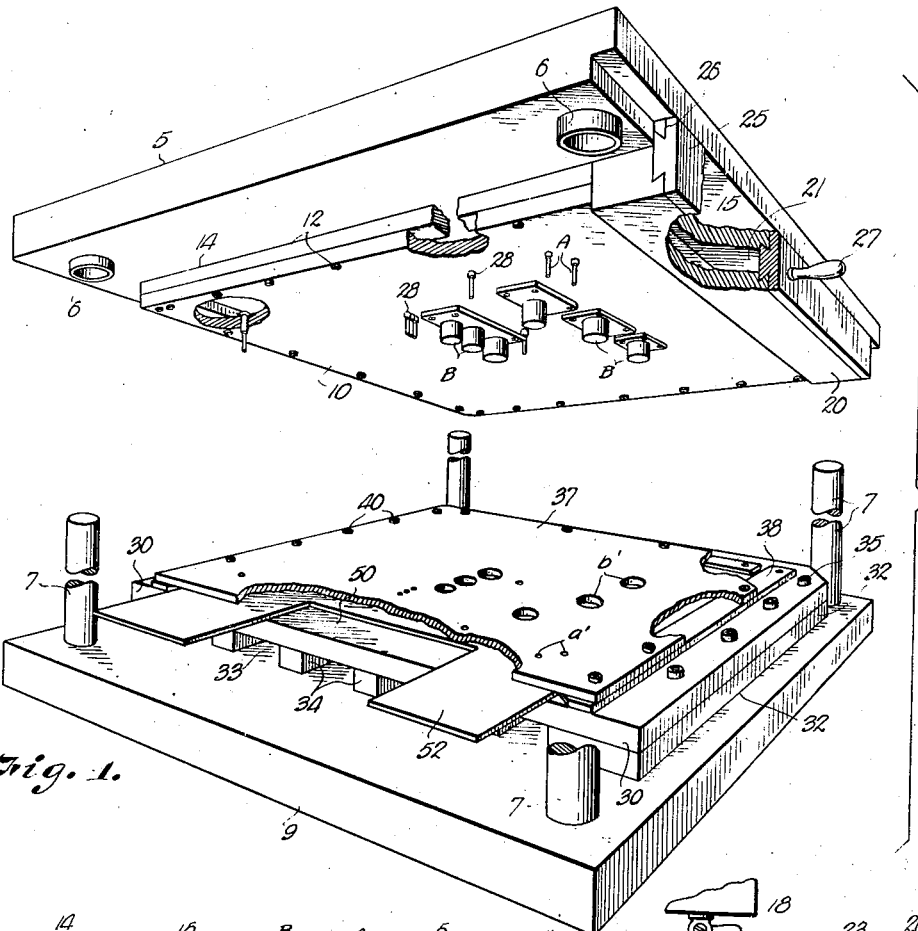

June 27, 1944.   P. KRATZMAIER   2,352,211

DIE WORKING MACHINERY

Filed May 10, 1943

INVENTOR.
Paul Kratzmaier,
BY Chas. W. Gerard.
ATTORNEY.

Patented June 27, 1944

2,352,211

UNITED STATES PATENT OFFICE 2,352,211

DIE WORKING MACHINERY

Paul Kratzmaier, Kansas City, Mo.

Application May 10, 1943, Serial No. 486,329

5 Claims. (Cl. 164—118)

The present invention relates to die working machinery, and the general object in view is to devise an improved apparatus of this character in which a great increase in the flexibility of die working operations is made possible by a new method of interchange from one die pattern to another with a marked saving in both time and labor, as well as expense.

Accordingly, the prime object of the invention is to provide a machine having tool holding means for a complete set or equipment of die tools for punching, stamping, etc., all of which are adapted to be retracted within said holding means into inoperative position at will, and also any number of them brought into operative position for producing a particular type of die action according to a pattern template by which the necessary tools are selected and rendered operative for this purpose.

For cooperation with the aforesaid tool holding means, die and stripper members are provided which are equipped with appropriate die openings and recesses for each and every one of the tools carried by said tool holding means, together with guideways and locating means whereby the work is properly positoned and held for the die operation.

It is further sought to provide a novel construction of this character in which the principal operating parts, comprising the die and tool holding means, may be removed and replaced by other similar parts but with different patterns and arrangements of the tools, die openings or recesses, etc.

Another important object of the invention is to provide a novel and highly efficient lubricating method and arrangement whereby the critical points to be lubricated are all automatically subjected to the lubricating action and under an appropriate degree of pressure which, combined with the movement of the tools, will produce the required travel of the lubricant throughout the length of said tools and without waste or unnecessary messing or spread of the lubricant to other parts.

With the foregoing general objects of my invention as above stated, the invention will now be described by reference to the accompanying drawing wherein is illustrated one form of apparatus which I have devised and found suitable for the embodiment of my proposed improvements—after which those features and combinations deemed to be novel and patentable will be duly set forth and claimed.

In the drawing—

Figure 2:
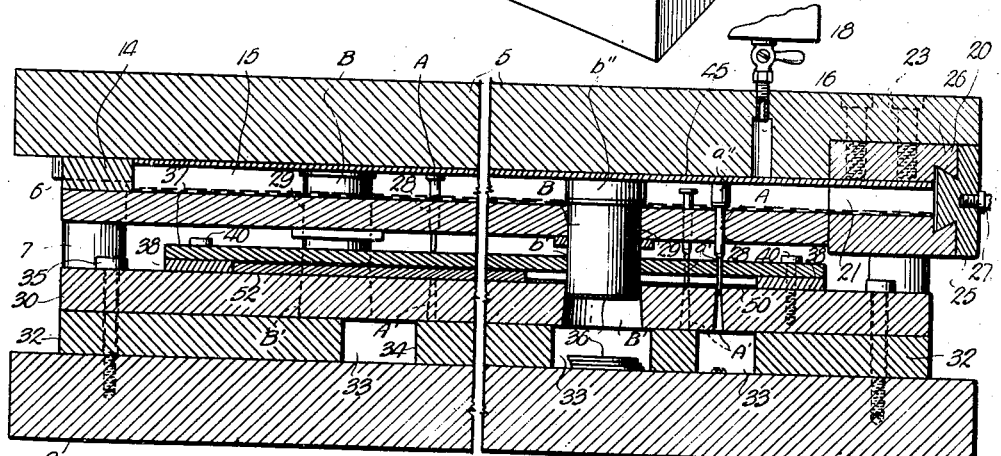

Figure 1 is a perspective view of the working portions of a die working machine constructed in accordance with the present invention, and with the die and tool holding means illustrated in separated relation; and Figure 2 is a vertical sectional view of said die and tool holding means in closed or die operating position.

Referring now to the drawing in detail, the improved features of construction are illustrated in connection with an apparatus comprising the usual upper die shoe member 5 having guide openings 6 for cooperation with guide members 7 carried by a lower base or shoe member 9.

Secured to the under face of the upper die shoe member 5 is a tool holding plate 10 attached removably in place by suitable fastenings 12 and in spaced relation to said shoe member 5 by virtue of the spacing bars or blocks 14, whereby an air-pressure and template chamber 15 is provided between said plate 10 and the upper shoe member 5. An air duct 16 affords means for admitting air under pressure to said chamber 15 from a source of compressed air supply, which is controlled as required by means of a suitable regulating valve 18, as shown in Figure 2.

An air lock construction is provided at one side of the tool holding means, which comprises a block 20 having a hollow interior chamber as indicated at 21 for registering with the template chamber 15 when said block 20 is secured in place by means of bolts 23; and a suitable air locking closure is provided by means of a plate 25 having a dove-tail sliding fit along one side of the block 20, as indicated at 26, and operated by means of a handle 27 for affording access to the chamber 15 when necessary for interchanging the tool-selecting template members, as hereinafter explained.

The tool holding plate 10 is designed to carry a set of any number and types of tools, such as cutting, piercing or punching tools A, blanking or stamping tools B, etc., or practically any conventional type of tool adapted to be carried in sliding or plunger relation by said plate 10 (having therefor the proper openings 28, 29, etc.), whereby said tools may be either projected into operative position or retracted into inoperative position, as represented by the different positions of the tools illustrated in Figure 2.

The lower base or shoe member 9 supports a lower die member 30 formed with a complete set of die openings or recesses A', B', etc., for cooperation with each and every one of the aforesaid tools for cutting, piercing, blanking, etc.—the said die member being supported by the side spacing plates 32 and intermediate parallel blocks or bars 34, and secured removably in place by suitable fastening bolts or screws 35. The spaces 33 between the supporting plates 32 and the bars or blocks 34 provide clearance passages for the blowing out of waste slugs and stampings (as indicated at 36) as in the usual practice.

Upon the upper face of the die member 30 is secured a stripper plate 37, also provided with a complete set of openings a', b', etc., for each and every one of the aforesaid tools A, B, etc.—said stripper plate being supported in spaced relation to the die member by means of spacing bars or plates 38 and secured in place by suitable bolts or screws 40.

The template means for controlling selectively the operation of the tools A, B, etc., according to the particular type or design of operation to be produced, comprises a pattern template 45 for each of such patterns or designs, which template is adapted to be inserted into the template chamber 15, and is provided with a set of bosses forming backstops or abutments a", b", etc., for the several tools A, B, etc., respectively, which are to be actuated in accordance with the different patterns or designs possible to be produced by the particular tool assembly carried by the tool holding plate 10.

Prior to the insertion of the template member 45 into the chamber 15, the space therein is required to be cleared of the upper end portions of the working tools, in order to clear the stops or abutments a", b", etc., which operation is effected by admitting air pressure sufficient to project all of the tools A, B, etc., downwardly out of the path of said stops or abutments as they enter the chamber. The said tools all have a push-fit in the openings 28, 29, etc., and in the die working operation of course only those tools are actuated to produce a working action which are engaged by said stops or abutments of the template member 45—the remaining tools all being simply retracted idly or pushed back into inoperative position on engaging the metal stock or other sheet material 50 on the die member 30, in an obvious manner. The flange formation at the upper ends of the tools, as illustrated, provides shoulder means adapted to prevent release or complete disengagement of the tools from the tool-holding plate 10.

The metal stock or other material forming the work 50 to be operated upon is properly located in the space between the die member 30 and the stripper plate 37 by means of any appropriate positioning device or pattern template 52, as illustrated.

From what has been said in the foregoing it will be understood that a die set up, as provided by a tool holding member 10 having a plurality of tools in a given variety and arrangement, together with a die member 30 and stripper plate 31 with die openings or recesses to correspond, affords a basis for a wide range of die operations, according to the selections made possible by the use of different template members 45 having different patterns or arrangements of stops or abutments for selectively controlling the operation of the tool elements, as will be readily understood. In addition, the range of operation is further extended by the variable positioning of the work by manipulation of the locating means comprising the positioning or pattern device between the die member 30 and stripper plate 37, as already referred to.

It will be understood, of course, that the specific character of the tools A, B, etc., is not important, these all being chosen according to the range of selections required by the different types of patterns or template members 45 necessitated by the production requirements of the machine. These tools, therefore, may be for punching or piercing, dimpling, cutting, stamping or blanking, or forming and shaping, or any conventional function for which tools of this general class may be adapted. Accordingly, the essential operation consists in clearing the chamber 15 for the insertion of the desired template member 45, by closing said chamber by means of the air-lock sliding member 25 and then admitting air pressure for driving all the tools downwardly into their operative position, and following up this step by reopening said chamber 15 and inserting the desired template member into the position illustrated in Figure 2. With the desired template member in control position, its arrangement of stops or abutments a", b", etc., provides the proper selective control of the tools to be operated for punching or otherwise treating the metal stock or other material 50, since all the other tools, after engaging said stock, are simply pushed back up into retracted or inoperative position, within the tool holder and therefore without any operation or effect upon the work, as will be readily understood.

The chamber or space 15 also affords a space for the maintenance of a supply of suitable lubricant, which may be supplied to said chamber in any suitable manner, whereupon said lubricant will of course spread to the openings 28, 29, etc., around the tools and naturally be further conducted through said openings by virtue of the operative travel of the tools. Moreover, one further advantage of the present improved construction is the availability of the air pressure to said chamber to promote the lubricating action by a more or less force feed action—that is, by a regulation of the air pressure (as through the medium of the valve 18), whereupon even lubricants of somewhat heavier consistency may be caused to flow and spread to the required extent for carrying out effectively the necessary lubricating action.

It will therefore be apparent that I have devised a practical and highly efficient arrangement and construction for carrying out all the desired objects of my invention, as before stated.

In this connection, it is to be understood, as already indicated, that the described construction is adapted for a still greater degree of flexibility by the fact that the upper tool holding member 10, as well as the lower die structure, are removable and interchangeable, for substituting different die tools and patterns upon the same die shoe members 5 and 9, without the necessity of complete new die sets or of making the complicated and intricate changes and adjustments that are required by the conventional types of apparatus now prevailing and in more or less general use.

Accordingly, while I have illustrated and described one form of construction and arrangement of apparatus which I have found to be thoroughly practical and efficient for carrying out all the aforesaid objects of my invention, I desire to be understood as expressly reserving the right to make all changes or modifications therein which may fairly fall within the spirit and scope of my invention as defined by the appended claims.

What I claim and desire to secure by Letters Patent is:

1. In apparatus of the character described, an upper die shoe member having a tool holding member associated therewith, means providing a combination air and oil chamber surrounding the heads of the tools, a plurality of working tools carried by said tool holding member, and means for introducing air pressure into said chamber above the surface of the oil therein for effecting a force feed action of the oil around said tools.

2. In apparatus of the character described, an upper die shoe member, a tool holding member carried by said shoe member and spaced therefrom to provide a template chamber surrounding the heads of the tools, a plurality of working tools carried by said holding member and retractible into said chamber, an air lock closure device adapted to permit interchange of templates within said chamber, and means for introducing air pressure into said chamber for actuating the tools out of the path of the template on insertion of the latter into operative position within the chamber.

3. In apparatus of the character described, an upper die shoe member having tool holding means associated therewith, means providing a template chamber surrounding the head ends of the tools, a plurality of working tools carried by said holding means and retractible into said chamber, a template member provided with stops or abutments for selective engagement with said tools and thereby actuating the same, air lock closure means adapted to permit interchanging of templates within said chamber, and means for introducing air pressure into said chamber for actuating the tools out of the path of said stops or abutments on insertion of said template member into operative position within said chamber.

4. In apparatus of the character described, upper and lower die shoe members, a tool holding member carried by the upper shoe member, means providing a template chamber surrounding the head ends of the tools, a plurality of working tools carried by said tool holding member and retractible within said chamber, a die and stripper means carried by the lower shoe member and having die openings and recesses respectively matching all of said tools, and template means removably inserted within said chamber for selectively actuating said tools.

5. Apparatus of the character described comprising, upper and lower die shoe members, tool holding means removably attached to the upper shoe member and spaced therefrom to provide a template chamber surrounding the head ends of the tools, a plurality of working tools carried by said tool holding means and retractible into said chamber, die and stripper members removably attached to the lower shoe member and having die openings and recesses respectively matching all of said tools, and a template member removably inserted within said chamber for selectively actuating said working tools.

PAUL KRATZMAIER.